Patented July 6, 1948

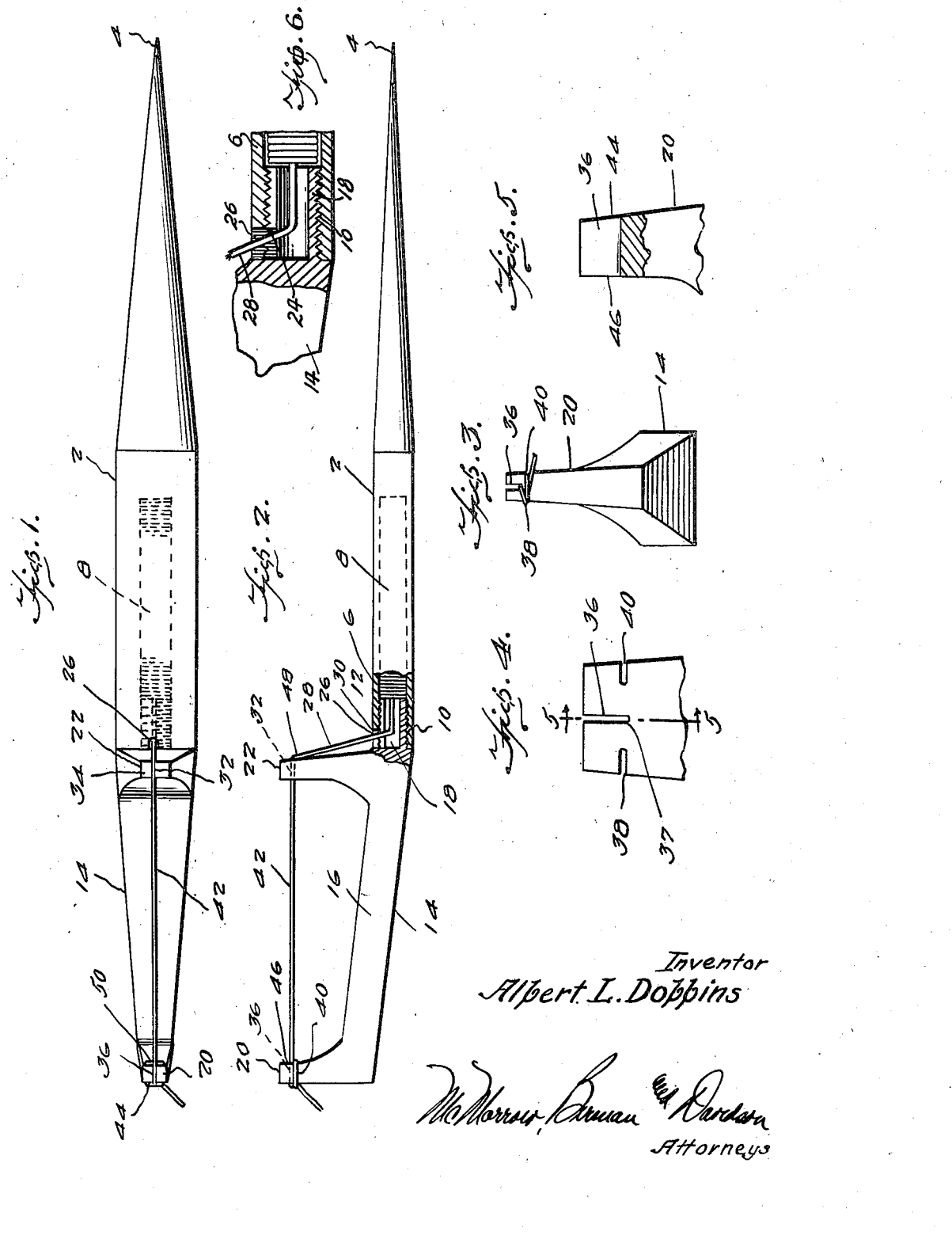

2,444,638

UNITED STATES PATENT OFFICE 2,444,638

TEETH CLEANING DEVICE

Albert L. Dobbins, Kansas City, Mo.

Application March 8, 1946, Serial No. 652,864

1 Claim. (Cl. 132—92)

This invention relates to devices for cleaning the teeth and removing obstructions and particles of food therefrom.

An object of the invention is to provide a device for this purpose which has mounted thereon a support for dental floss or the like in such position that it may be easily drawn between the teeth for cleaning them of foreign matter.

Another object of the invention is to provide a device of this character which is inexpensive to manufacture and simple and effective in cleaning teeth.

A further object of the invention is to provide a teeth cleaning device wherein the dental floss is drawn from a spool of floss carried on or concealed within the teeth cleaning device.

Another object of the invention is to provide a teeth cleaning device which, while adapted for use with dental floss, may also be used in the manner of a toothpick by means of a pointed probe carried thereon.

Still another object of the invention is to provide a teeth cleaning device which is sanitary and easy to clean and keep clean.

Other objects and advantages of the invention will become apparent from the following description of a preferred embodiment thereof as illustrated in the accompanying drawing, and in which:

Figure 1 is a plan view of my improved teeth cleaning device.

Figure 2 is a front elevational view, partly in section, of the device illustrated in Figure 1.

Figure 3 is an end view of the device as seen from the left of Figure 2,

Figure 4 is an enlarged detail view of the slotted upper end of the dental floss support shown in Figure 3, and Figure 5 is a partly sectional view taken along line 5—5 of Figure 4.

Figure 6 is an enlarged fragmentary sectional view illustrating the L-shaped slot in the rearward extension of the head and the registering opening in the wall of the longitudinal recess in the handle.

As illustrated, there is a handle 2 shaped to fit the hand conveniently and having its right hand end portion shown in Figures 1 and 2 tapered to a sharp point with its apex at 4. The pointed portion 4 is intended for use as a probe in the ordinary manner of a toothpick, with the added advantage that it is held in a handle sufficiently large to be easily and securely held in the hand, and is not easily broken. The handle 2 has in its forward end portion 6 a longitudinal recess 8 which is open at its forward end 10, the mouth of the opening being provided with threads 12.

The tooth cleaner head 14 has a body portion 16 with a threaded rearward extension 18 for threaded engagement into the matching threads 12 at the mouth of the opening 10 of recess 8 in the handle. The head 14 is provided with upstanding dental floss supports 20 and 22 at the opposite ends of the cleaner head 14. The threaded extension 18 of the head 14 is provided with an L-shaped duct 24 leading from the longitudinal recess 8 in the handle 2, and registering with a matching aperture 26 in the wall of the mouth of the opening 10. A spool of dental floss is inserted into the recess 8 and the loose end of the floss is threaded through the duct 24, and out as at 28 and up across the floss supports 20 and 22. To avoid interference with the egress of the loose end 28 of the floss as it emerges from the duct 24, the edge 30 of the mouth of the opening 10 of the recess 8 may be cut back so as not to obstruct the open end of the duct 24, the aperture 26 being dispensed with in that case. To draw dental floss out of the magazine recess 8, it is only necessary to pull on loose end 28 of the floss, pulling out a length sufficiently long to reach up and over both supports as shown.

The support 22 has a slot 32 in its upper face surface 34, the slot lying in a plane containing the longitudinal axis of the handle as seen in Figure 1. The floss, extending through slot 32 continues to forward floss support 20 which is provided with a similar slot 36, in its upper surface and parallel with slot 32. The support 20 also has two side slots 38 and 40 as best seen in Figure 4, both lying in a plane at right angles to that of slot 36, the lower edge 37 of slot 36 also lying substantially in the same plane as that of the side slots.

As will be clear from the drawings, the dental floss extends upward at 28, through slot 32 in floss support 22, bridging across the intervening space as at 42 through slot 36 on top of forward floss support 20, thence around the front end edge 44 of front floss support 20 and rearwardly through side slot 38, then across the rear end edge 46 underneath bridging portion 42 of the floss and around into side slot 40 and forwardly out of the latter slot. It is apparent that these sharp turns of the floss such as at 48 where it enters slot 32, and at the turning points as it is arranged in the slots on forward support 20, together with the tight crossing over engagement of the bridging portion 42 of the floss with the portion 50 of the floss as it crosses over from side slot 38 to slot 40. This arrangement will normally be sufficient to properly tension the bridging portions 42 of the floss. However, if desired, the rearward floss support 22 may also be provided with side slots similar to those shown on the forward support at 38 and 40, the floss being disposed in the slots in the same fashion as already described.

It is thus to be noted that I have described and illustrated a teeth cleaning device which is simple and practical, sanitary in construction, and efficient in operation, and which does not require the insertion of the fingers into the mouth of the user for application of the dental floss. The device may conveniently be made of plastic material.

Although I have described a preferred embodiment of my invention in specific terms, it is to be understood that various changes may be made in size, shape, materials and arrangement without departing from the spirit and scope of my invention.

I claim:

A device for cleaning teeth comprising a handle having a forwardly open recess for the reception of a supply of dental floss therein, the mouth of said recess being threaded and having an aperture in a wall thereof, a head having a pair of upstanding support members longitudinally spaced from each other, said head being provided with a tubular threaded extension threaded into said mouth, there being an L-shaped duct in said extension, said L-shaped duct registering with the aperture in said mouth to form a duct leading from said recess and out of said handle for the passage therethrough of the dental floss from said supply, each support member being provided at its distal end portion with a guide slot extending longitudinally therethrough, the guide slots in said support members suspendingly supporting a length of the dental floss drawn from said recess, the support member farthest removed from the recess in said handle being provided upon opposite sides of its longitudinal guide slot with slots extending transversely from the side edges thereof and terminating at a point spaced from the guide slot, whereby passing the end of the dental floss projecting from the longitudinal guide slot around the front face of the distal end portion through one of said transverse slots and then rearwardly across the back face of the distal portion underneath the portion of the floss in the longitudinal slot, and thence into the other of said transverse slots and forwardly out of the latter slot, places the dental floss suspendingly supported between said support members under tension and secures the tensioned floss.

ALBERT L. DOBBINS.

REFERENCES CITED

The following references are of record in the file of this patent:

UNITED STATES PATENTS

| Number | Name | Date |
| --- | --- | --- |
| 577,468 | Tissington | Feb. 23, 1897 |
| 1,166,732 | Woodhouse | Jan. 4, 1916 |
| 1,488,214 | Mason | Mar. 25, 1924 |
| 2,067,692 | Cammack | Jan. 12, 1937 |